United States Patent [19]
Tanaka

[11] Patent Number: 5,068,844
[45] Date of Patent: Nov. 26, 1991

[54] OBJECTIVE LENS MOUNT UTILIZING LEAF SPRINGS

[75] Inventor: Akihiro Tanaka, Tokyo, Japan

[73] Assignee: Asahi Kogaku Kogyo K.K., Tokyo, Japan

[21] Appl. No.: 322,033

[22] Filed: Mar. 13, 1989

[30] Foreign Application Priority Data

Mar. 14, 1988 [JP] Japan .................................. 63-59819

[51] Int. Cl.⁵ .............................................. G11B 7/12
[52] U.S. Cl. ............................................... 369/44.16
[58] Field of Search ........................... 369/44.15, 44.16

[56] References Cited

U.S. PATENT DOCUMENTS

| | | | |
|---|---|---|---|
| 4,302,830 | 11/1981 | Hamaoka et al. | 369/44.13 |
| 4,482,986 | 11/1984 | Noda et al. | 369/44.16 |
| 4,813,033 | 3/1989 | Baasch et al. | 369/44.16 |

FOREIGN PATENT DOCUMENTS 62-5480  1/1987  Japan .
62-112239  5/1987  Japan .
62-125544  6/1987  Japan .

Primary Examiner—Robert L. Richardson
Attorney, Agent, or Firm—Sughrue, Mion, Zinn, Macpeak & Seas

[57] ABSTRACT

A device for supporting an objective lens of an optical pickup in which one end of a first leaf spring is secured to a spring mounting portion of a base through a first elastic member. A connective member is secured to the other end of the first leaf spring through a second elastic member. One end of a second leaf spring is secured to the connective member through a third elastic member. A holder member for holding an objective lens is secured to the other end of the second leaf spring through a fourth elastic member. The objective lens is displaceable by one of the two leaf springs in a tracking direction and is displaceable by the other leaf spring in a focusing direction. Each of said elastic members is made of an elastic material different in elastic force from the leaf springs.

7 Claims, 2 Drawing Sheets

OBJECTIVE LENS MOUNT UTILIZING LEAF SPRINGS

BACKGROUND OF THE INVENTION

1. Field of the Invention

This invention relates to a device for supporting an objective lens of an optical pickup in which the objective lens is supported on a base through leaf springs so that the lens can be displaced in both tracking and focusing directions.

2. Brief Description of the Related Art

Generally, in optical pickups, a beam from a light source is projected as a spot onto a rotating optical disc through an objective lens so that information can be recorded onto, and/or reproduced from, the optical disc. Therefore, it is necessary that the objective lens form the light beam into a spot having a constant diameter, and that the light beam spot be projected on an information recording track of the optical disc.

However, due to various factors, there are occasions when the spot deviates from the track, resulting in tracking error, and other occasions when the spot diameter varies, resulting in focusing errors. For this reason, one current procedure for overcoming these problems is to detect such tracking and focusing errors and to drive the objective lens so that it is displaced in the tracking and focusing directions in accordance with the amounts of such errors so as to effect the necessary adjustment. In this manner, the errors in the tracking and focusing directions are corrected to achieve good recording and reproduction.

In one conventional device, in order for the objective lens to be displaced in the tracking and focusing directions, a first leaf spring is secured at one end to a spring mounting portion of a base, and the other end of the first leaf spring is secured to a first spring mounting portion of a connective member. A second leaf spring is secured at one end to a second spring mounting portion of the connective member. In addition, a spring mounting portion of a holder member for holding the objective lens is secured to the other end of the second leaf spring. As a result, the objective lens can be displaced in the tracking direction by one of the two leaf springs and can be displaced in the focusing direction by the other leaf spring.

An exciting current corresponding to the amount of each error, is sent through a coil mounted on the lens holder member, thereby changing the magnetic force produced in this coil. As a result, the objective lens is driven so that it is displaced in the tracking and focusing directions by a combination of the thus changed magnetic force and the magnetic forces of permanent magnets mounted on the base. Similar devices are disclosed in Japanese Laid-Open (Kokai) Patent Application Nos. 5480/87 and 112239/87.

In such a construction, however, since a rigid body mode inevitably remains and the leaf springs supporting the objective lens have respective natural modes, when the oscillation frequency of the objective lens in the tracking or focusing directions coincides with the natural frequency of the rigid body mode or the natural mode of each leaf spring, there occurs a resonance phenomenon which may then adversely affect the objective lens driving characteristics.

One procedure to prevent such a phenomenon, as disclosed in Japanese Laid-Open (Kokai) Patent Application No. 125544/87, is to use a leaf spring having a laminate construction. Such a leaf spring includes a pair of metal leaf spring elements and an adhesive elastic sheet connecting the pair of leaf spring elements together. With this arrangement, the elastic force of the adhesive elastic sheet can restrain the resonance level to a certain degree.

However, since the leaf spring of the laminate construction uses metal leaf spring elements, the natural oscillation mode of the metal leaf spring elements remains, and depending on the residual level of these metal leaf spring elements, this natural oscillation mode adversely affects the objective lens driving characteristics. In addition, the rigid body mode should not be weakened too much as a result of this laminate construction. Further, since the leaf spring of the laminate construction is constructed from sheet-like members having different elastic forces, the leaf spring is liable to be affected by variations in the fundamental objective lens driving characteristics and by environmental variations (for example, a temperature change, a moisture change, etc.). In addition, considerable time and labor are required to manufacture such a leaf spring, and therefore the cost is high.

SUMMARY OF THE INVENTION

It is therefore an object of this invention to provide a device for supporting an objective lens of an optical pickup in which, although an objective lens is supported on a base through leaf springs, the effects of the rigid body mode and the natural oscillation mode of the leaf springs can be restrained to a satisfactory level.

The above and other objects are achieved by a device for supporting an objective lens of an optical pickup in which one end of a first leaf spring is secured to a spring mounting portion of a base through a first elastic member. A connective member is secured to the other end of the first leaf spring through a second elastic member. One end of a second leaf spring is secured to the connective member through a third elastic member. A holder member for holding an objective lens is secured to the other end of the second leaf spring through a fourth elastic member. Thus the objective lens is displaceable by one of the two leaf springs in a tracking direction and is displaceable by the other leaf spring in a focusing direction. Each of the elastic members is made of an elastic material different in elastic force from the leaf springs.

DETAILED DESCRIPTION OF THE PREFERRED EMBODIMENTS

A preferred embodiment of the invention will now be described with reference to the drawings.

Figure 1:
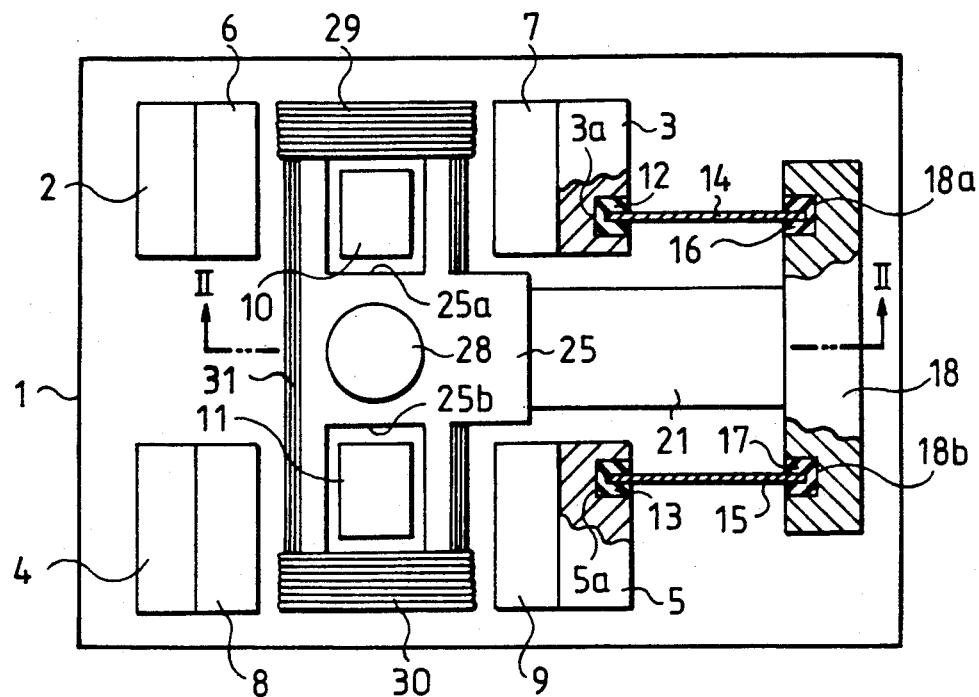
FIG. 1 is a schematic view of an objective lens drive device incorporating an objective lens supporting structure according to the present invention.

In FIG. 1, reference numeral 1 denotes a base for supporting an objective lens. Four upstanding yokes 2, 3, 4 and 5 are mounted on the base 1 in such a manner that they form four corners of an imaginary square. Permanent magnets 6 and 7 are secured to the opposed surfaces of the yokes 2 and 3, respectively, and permanent magnets 8 and 9 are secured to the opposed surfaces of the yokes 4 and 5, respectively. Upstanding opposed yokes 10 and 11 are mounted on the base 1 and are disposed respectively at a midpoint between the permanent magnets 6 and 7 and at a midpoint between the permanent magnets 8 and 9. The yokes 2 and 3, the permanent magnets 6 and 7 and the opposed yoke 10 constitute a closed magnetic circuit. Likewise, the yokes 4 and 5, the permanent magnets 8 and 9 and the opposed yoke 11 also constitute a closed magnetic circuit.

The yokes 3 and 5 are used as spring mounting portions of the base 1. The yokes 3 and 5 have respective recesses 3a and 5a formed in their surfaces facing away from the permanent magnets 7 and 9. Elastic members 12 and 13 are mounted in the recesses 3a and 5a, respectively, and metal tracking leaf springs 14 and 15 serving as first leaf springs are embedded in and secured to the elastic members 12 and 13 at their first ends, respectively. The other ends of the tracking leaf springs 14 and 15 are respectively embedded in and secured to elastic members 16 and 17 which are mounted respectively in recesses 18a and 18b formed in a connective member 18. The recesses 18a and 18b are first spring mounting portions.

Figure 2:
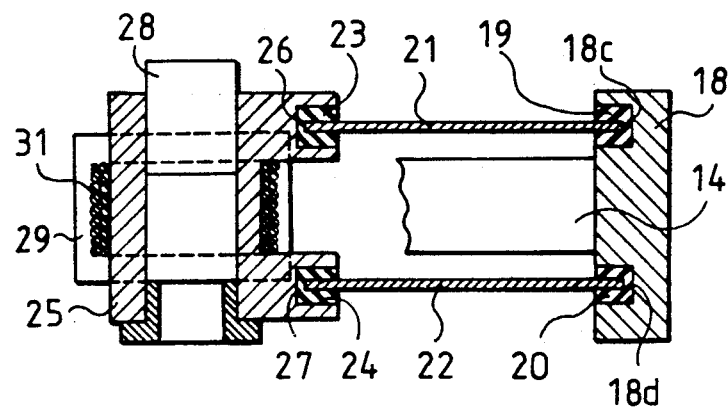
FIG. 2 is a cross-sectional view taken along the line II—II of FIG. 1.

As shown in FIG. 2, also formed in the connective member 18 are recesses 18c and 18d which serve as second spring mounting portions. Elastic members 19 and 20 are mounted in the recesses 18c and 18d, respectively. Metal focusing leaf springs 21 and 22 serve as second leaf springs and have first ends embedded in and secured to the elastic members 19 and 20 respectively. The other ends of the focusing leaf springs 21 and 22 are respectively embedded in and secured to elastic members 23 and 24 which are mounted respectively in recesses 26 and 27 formed in a lens holder member 25. The recesses 26 and 27 serve as spring mounting portions.

The elastic members 12, 13, 16, 17, 19, 20, 23 and 24 are made of a material which has an elastic force different from that of the leaf springs 14, 15, 21 and 22, such material being, for example, rubber and a synthetic resin. One example of such material is an adhesive of the type having both adhesive and elastic properties even after it is cured (i.e., an ultraviolet curing acrylic adhesive).

One end portion of the lens holder member 25 is interposed between the permanent magnets 6 and 7, while the other end portion is interposed between the permanent magnets 8 and 9. An objective lens 28 is mounted on a central portion of the lens holder member 25. Yoke insertion holes 25a and 25b are formed through the lens holder member 25 adjacent the respective opposite ends thereof. The opposed yokes 10 and 11 extend through the yoke insertion holes 25a and 25b, respectively. Tracking coils 29 and 30 are wound around the opposite end portions of the lens holder member 25, respectively, and a focusing coil 31 is wound around the side surfaces of the lens holder member 25.

Figure 3:
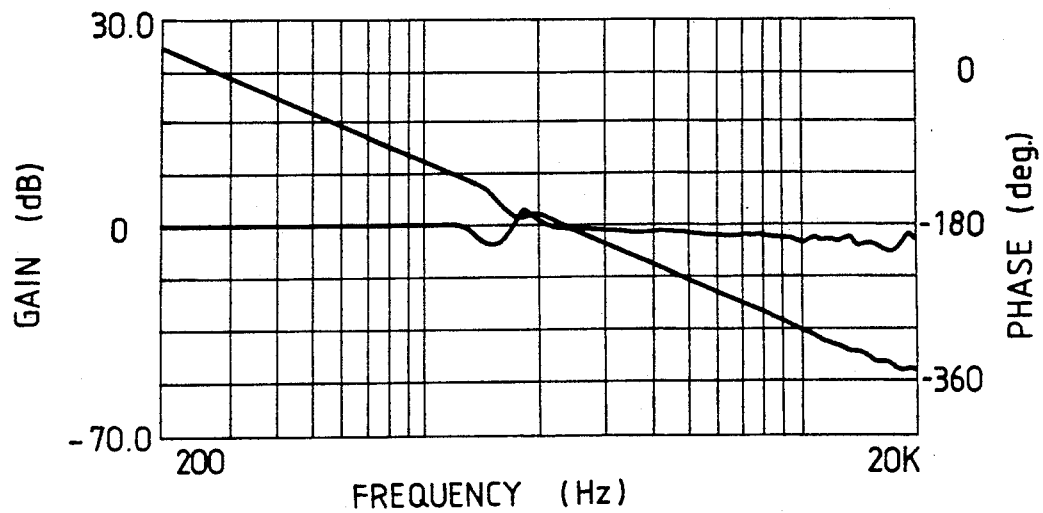
FIG. 3 is a graph illustrating oscillation characteristics of a conventional objective lens supporting structure.
Figure 4:
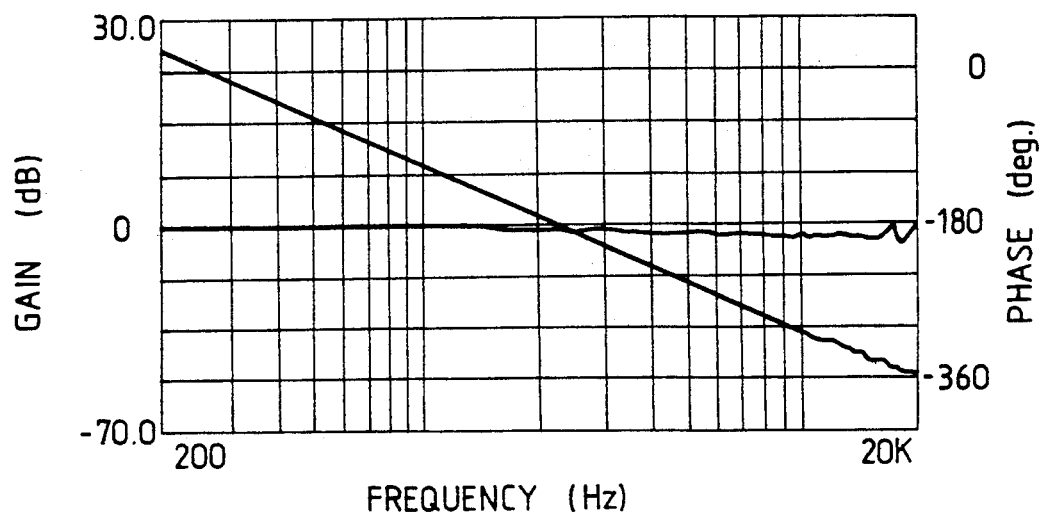
FIG. 4 is a graph illustrating oscillation characteristics of the object lens supporting structure of the present invention.

Frequency response characteristics of the objective lens supporting device of the invention, obtained when the frequency f of a drive exciting current flowing through the coils 29, 30 and 31 of the device was varied, as well as frequency response characteristics of the conventional objective lens supporting device employing leaf springs of a laminate construction, were measured. In the conventional device, influences on the resonance due to the rigid body mode and the natural oscillation mode of the leaf springs occurred in the range of 1 KHz to 2 KHz, as shown in FIG. 3, so that the gain and the phase were unstable. In contrast, in the device of the invention, such influences as were encountered with the conventional device did not appear, as shown in FIG. 4, and the gain and the phase were stable even in the range of 1 KHz to 2 KHz. The abscissa in FIGS. 3 and 4 denote logarithmic scales.

As described above, in the invention, first ends of the first leaf springs are secured to the spring mounting portions of the base through the elastic members. The connective member is secured to the other ends of the first leaf springs through the elastic members. First ends of the second leaf springs are secured to the connective member through the elastic members, while the holder member for holding the objective lens is secured to the other ends of the second leaf springs through elastic members. The objective lens is displaceable by one of the two groups of leaf springs in a tracking direction, and also is displaceable by the other group of leaf springs in a focusing direction. Each of the elastic members is made of an elastic material having a different elastic force from the leaf springs. With this construction, the influences of resonance due to the rigid body mode and the natural oscillation mode of the leaf springs can be sufficiently restrained even if the objective lens is supported on the base by the leaf springs.

Although the foregoing description is made in conjunction with the preferred embodiment using two pairs of leaf springs, the invention is not limited thereto, and each pair of leaf springs may be replaced by a single leaf spring of multiple leaf construction.

What is claimed is:

1. A device for supporting an objective lens of an optical pickup, comprising:
    a base;
    at least one first leaf spring having a first end secured to a spring mounting portion of said base through an elastic member;
    a connective member secured to a second end of said first leaf spring through an elastic member;
    at least one second leaf spring having a first end secured to said connective member through an elastic member; and
    a holder member for holding an objective lens and being connected to a second end of said second leaf spring through an elastic member;
    wherein movement of said objective lens in a tracking direction is controlled by one of said first and second leaf springs, and movement of said objective lens in a focusing direction is controlled by the other of said first and second leaf springs, and
    wherein each of said elastic members is made of an elastic material having an elastic force different from that of said first leaf spring and said second leaf spring.

2. A device as recited in claim 1, further comprising another said first leaf springs.

3. A device as recited in claim 2, further comprising another said second leaf springs.

4. A device as recited in claim 1, further comprising:
    four upstanding yokes mounted at the corners of an imaginary square;

a pair of first permanent magnets attached to opposing surfaces of a first two of said four upstanding yokes;

a pair of second permanent magnets attached to opposing surfaces of a second two of said four upstanding yokes; and a pair of upstanding opposed yokes mounted on said base so that a first one of said pair of upstanding opposed yokes is disposed midway between said first permanent magnets, and a second one of said pair of upstanding opposed yokes is disposed midway between said second permanent magnets, wherein said pair of first permanent magnets, said first two upstanding yokes, and said first upstanding opposed yoke form a closed magnetic circuit, wherein said pair of second permanent magnets, said second two upstanding yokes, and said second upstanding opposed yoke form a closed magnetic circuit, wherein one of said first two of said four upstanding yokes and one of said second two of said four upstanding yokes form said spring mounting portion of said base, and wherein a first end of said holder member extends between said first permanent magnets, and a second end of said holder member extends between said second permanent magnets.

5. A device as recited in claim 1, wherein said elastic members are mounted in recesses in said spring mounting portion, said holder member and said connective member.

6. A device as recited in claim 4, wherein said pair of upstanding opposed yokes extends through yoke insertion holes in said holder member.

7. A device as recited in claim 4, further comprising:

a first tracking coil wound around said first end of said holder member;

a second tracking coil wound around said second end of said holder member; and a focusing coil wound around side surfaces of said holder member.

* * * * *